United States Patent [19]

Allen et al.

[11] Patent Number: 5,409,642
[45] Date of Patent: Apr. 25, 1995

[54] MELT BLOWING OF TUBULAR FILTERS

[75] Inventors: Martin A. Allen; John T. Fetcko, both of Dawsonville, Ga.

[73] Assignee: Exxon Chemical Patents Inc., Linden, N.J.

[21] Appl. No.: 132,638

[22] Filed: Oct. 6, 1993

[51] Int. Cl.6 ............................................. B29C 47/00
[52] U.S. Cl. ......................................... 264/6; 264/12; 264/113; 264/DIG. 48; 156/167; 425/7; 425/72.2
[58] Field of Search ...................... 264/6, 12, 113, 115, 264/DIG. 48; 425/7, 72.2; 156/167, 173, 175

[56] References Cited

U.S. PATENT DOCUMENTS

| 3,502,763 | 3/1970 | Hartmann | 425/72.2 |
|---|---|---|---|
| 3,933,557 | 1/1976 | Pall | 156/167 |
| 4,021,281 | 5/1977 | Pall | 156/167 |
| 4,032,688 | 6/1977 | Pall | 428/36 |
| 4,112,159 | 9/1978 | Pall | 428/36 |
| 4,116,738 | 9/1978 | Pall | 156/167 |
| 4,594,202 | 6/1986 | Pall et al. | 264/8 |
| 4,714,647 | 12/1987 | Shipp, Jr. et al. | 428/212 |
| 4,731,215 | 3/1988 | Schwarz | 156/167 |
| 4,738,740 | 4/1988 | Pinchuk et al. | 156/167 |
| 5,122,048 | 6/1992 | Deeds | 425/72.2 |
| 5,145,689 | 9/1992 | Allen et al. | 425/72.2 |
| 5,236,641 | 8/1993 | Allen et al. | 264/40.1 |

*Primary Examiner*—Mary Lynn Theisen
*Attorney, Agent, or Firm*—R. L. Graham

[57] ABSTRACT

An apparatus and method for producing a meltblown continuous and seamless nonwoven tube is described. The apparatus comprises a meltblowing die for extruding two groups of polymer thermoplastic filaments onto a rotating mandrel to form a multilayer layer tube thereon. The tube is withdrawn from the mandrel by a rotating screw. The present apparatus is capable of producing nonwoven tubes having variable fiber diameters and/or composition in the radial direction, making them ideally suited for filtration purposes.

20 Claims, 6 Drawing Sheets

MELT BLOWING OF TUBULAR FILTERS

BACKGROUND OF THE INVENTION

This invention relates generally to nonwoven tubular filters. In one aspect, the invention relates to the manufacture of nonwoven tubular filters in which nonwoven fibers are deposited on a rotating mandrel. In another aspect, the invention relates to the withdrawal of the tubular filter formed on a rotating mandrel.

Nonwoven fabric, particularly meltblown fabric, have long been used as filters. Because of the microsize of the filters (i.e. microporosity) and the random collection of the fibers, the meltblown fabrics exhibit excellent properties of filtration at reasonable pressure losses. Meltblown fabrics are generally made by forming a web which can be readily converted to a plainer filter. For example U.S. Pat. 4,714,647 discloses the manufacture of meltblown filters, wherein fibers of the same composition but different sizes are collected on a horizontal plane and used as a multi-layered filter.

It is difficult to convert meltblown webs into tubular filters because of the need for tubular filters to be continuous without a bonding seam. For example, if the web disclosed in U.S. Pat. Nos. 4,714,647 were rolled into a tube, a seam would be required to secure the inner and outer edges to the tube body.

Efforts have been made to form the meltblown web directly into a tube continuously on a mandrel. For example, in U.S. Pat. Nos. 3,933,557 and 4,032,688, meltblown fibers are deposited onto a rotating mandrel forming a tube which is continuously withdrawn and cut to proper length for the filter. The meltblowing die is positioned at an angle with respect to the axis of the mandrel so that a variation in density of the fibers is achieved as the tube moves longitudinally on the mandrel through the zone of fiber deposition.

U.S. Pat. Nos. 4,112,159 and 4,116,738 also disclose the deposition of meltblown fibers onto a rotating mandrel. The apparatus disclosed in these patents, however, deposit the fibers onto a core so that the final tubular filter comprises the core and the fibers wound about the core.

U.S. Pat. No. 4,021,281 discloses the deposition of meltblown fibers onto a rotating drum to form a relatively large diameter tube which is then flattened thereby forming a two-layer web. The web then is wound about a core material forming a tubular filter. The filter, however, is not continuous.

U.S. Pat. No. 4,594,202 discloses an apparatus for forming tubular filters by depositing meltblown fibers onto a drum which are then rolled onto a mandrel.

As discussed in U.S. Pat. No. 4,714,647, in many filters it is desirable to have a variable fiber size gradient across the filter. The fiber size gradient across the filter (i.e. in the direction of fluid flow) combines the filtration efficiency of each filtration layer. As described in U.S. Pat. 4,714,647, the first layer comprises meltblown fibers having large fiber size, the intermediate layers have medium fiber size, and the final layer has small fiber size. The pore size is a function of fiber size so that the filtration of the laminate described above would result in the separation of large particles in the first layer, medium size particles in the second layer, and finally the smallest particles in the final layer.

The same filtration principles would apply in tubular filters. However, it has been difficult to provide a continuous filter having a fiber size gradient across the radius of the filter.

SUMMARY OF THE INVENTION

The method and apparatus of the present invention produces a seamless, continuous nonwoven tube which is ideally suited for tubular filter application.

In a preferred embodiment, the tube or tubular filter produced by principles of the present invention comprises a multi-layer tube, with each layer having different characteristics, dimensions, or properties. For example, the tube may have a fiber size gradient differing radially between the layers.

The apparatus of the present invention briefly comprises a die having a row of orifices, divided into at least two side-by-side groups; a rotating mandrel positioned in alignment with the row of orifices to receive and wind up the filaments extruded therefrom; and means for extruding polymer through the orifices of each group at a different rate. Preferably, such means comprises two pumps (one for each orifice group).

In operation of the apparatus, the rate of polymer passing through each orifice group may be varied so that the filaments from one group collected on the mandrel therefrom are different in size from the filaments of the other group or groups. This produces a multi-layered tubular filter wherein each layer may be varied to enhance filtration, as by providing a fiber size gradient along the radius of the tube.

The method carried out by the apparatus includes the steps of meltblowing filaments from a first row of orifices onto a rotating mandrel to form a first layer thereon, meltblowing filaments from a second row of orifices onto the first layer of filaments to form a composite of two layers, and continuously withdrawing the composite from the mandrel. Composites of more layers may be formed by adding third or fourth groups in the orifice row. The process may be carried out by a single die constructed to permit separate control of polymer throughput or composition extruded through selected groups of orifices of the die. The process forms a novel multilayer tube wherein the filaments of each layer have different properties or dimensions.

Another important feature of the present invention is the mandrel assembly for continuously discharging the nonwoven tube. The mandrel assembly comprises two concentric, corotating shafts. The outer shaft is hollow and has a smooth surface for receiving and winding up filaments extruded from the majority of the orifices. The inner shaft is concentrically mounted in the outer Shaft and has an end portion extending axially outwardly therefrom. The end portion is threaded and is positioned to receive and wind up filaments extruded from a minor portion of the orifices. The inner shaft (including the threaded end portion) is driven at a slightly higher rpm than the outer shaft so that the tube of filaments collected and wound about the mandrel, by action of the threads engaging the inner surface of the filament tube, is moved along the mandrel and discharged off the distal end of the inner shaft.

DESCRIPTION OF THE PREFERRED EMBODIMENTS

Figure 1:
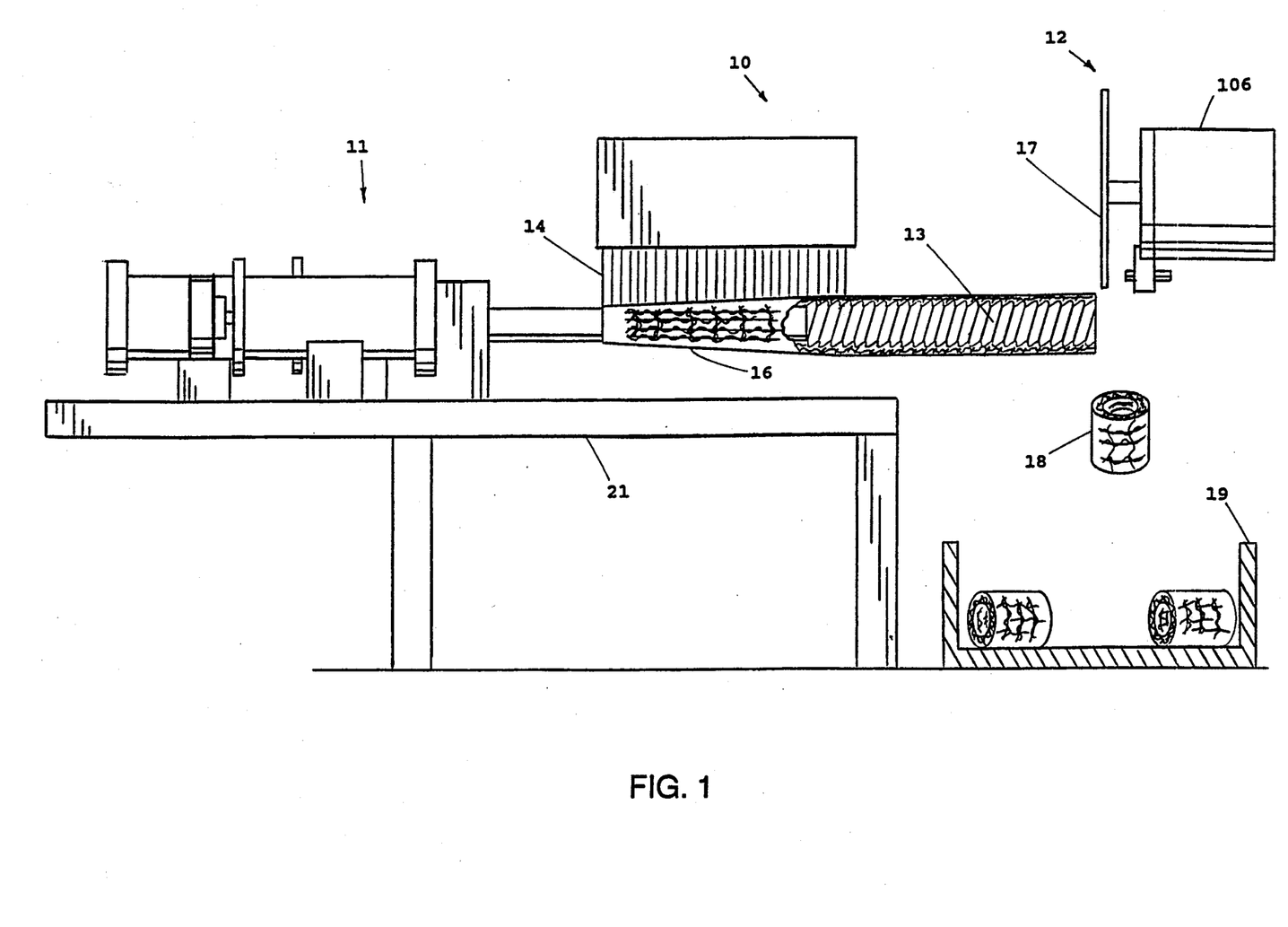
FIG. 1 is a side elevational view of the apparatus constructed according to the present invention.

With reference to FIG. 1, the apparatus for manufacturing meltblown tubular filters comprises meltblowing system 10, a mandrel assembly 11, and a cutting and collecting assembly 12.

Briefly, the mandrel assembly is provided with a rotating mandrel 13 which is positioned in longitudinal alignment with the die of the meltblowing system 10. Fibers 14 extruded from the die are deposited and wound around the rotating mandrel 13 forming a tube 16 of random fibers. The tube 16 is moved across the length of the meltblowing die in alignment with the row of fibers 14 causing the tube 16 to grow in diameter as additional fibers are wound thereabout. The full diameter tube 16 is driven off the end of the mandrel 13 and cut to the proper filter length forming tubular filter 18. The filters 18 may be collected in suitable container 19. The main components may be mounted on a frame 21.

Details of the present invention will be described with reference to the Meltblowing System 10, the Mandrel Assembly 11, and the Cutting and Collecting Assembly 12.

Meltblowing System

Figure 2:
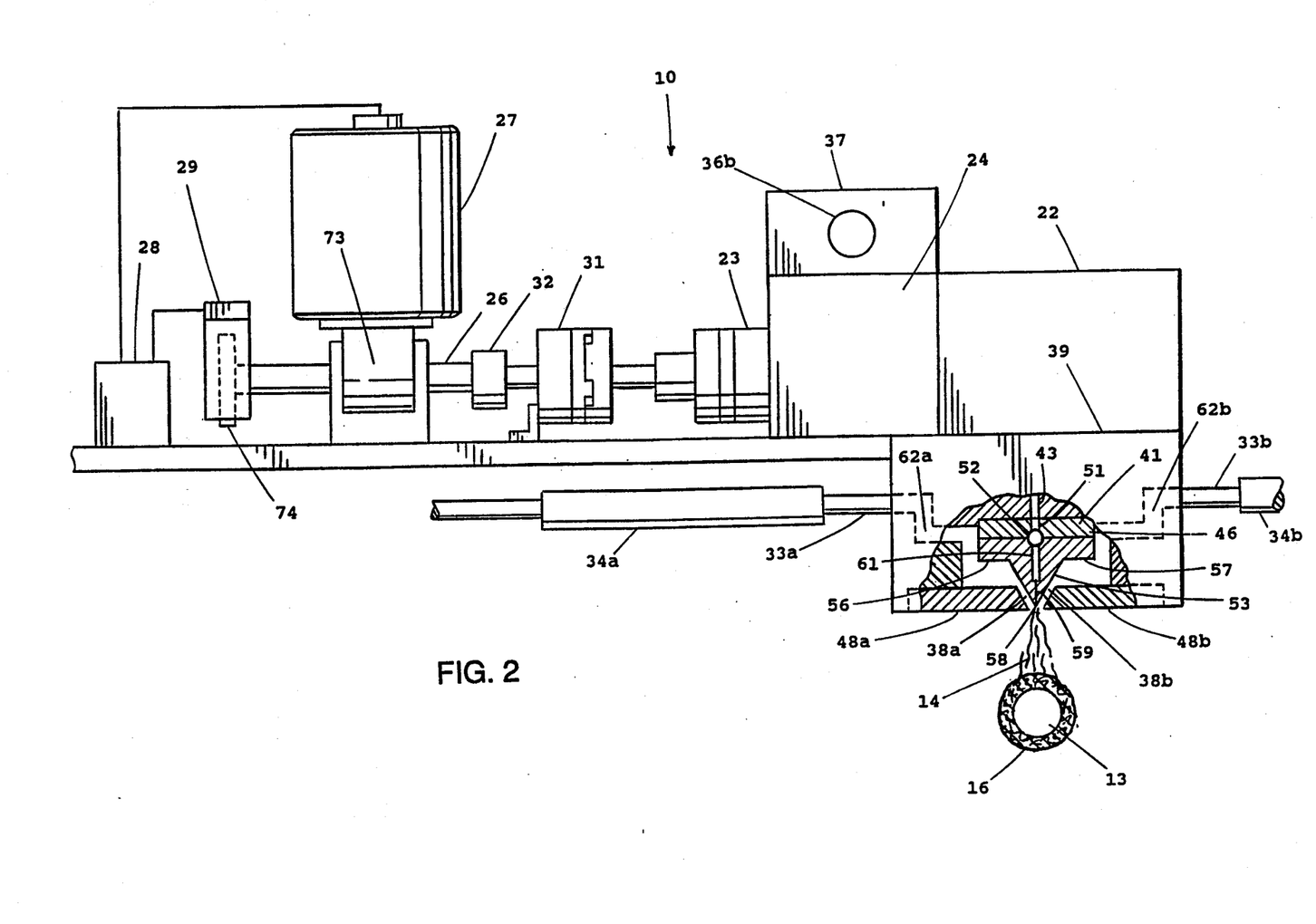
FIG. 2 is an end view of the apparatus shown in FIG. 1 from the perspective indicated by the plane of 2:2 of FIG. 3.

With reference to FIG. 2, the meltblowing system 10 comprises a plurality of meltblown units, each of which includes die assembly 22, a pump assembly 23, a pump manifold 24, a drive shaft 26, an electric motor 27, motor controls 28, and a sensor assembly (e.g. tachometer) 29. The drive shaft 26 may also include an electromagnetic clutch 31 and coupling 32. Hot air through lines 33a and 33b, each of which may include an in-line heater. 34a and 34b, is delivered to opposite sides of the die assembly 22. The rotating mandrel 13 is positioned below the die assembly 22 for receiving the meltblown fibers discharged therefrom to form tube 16.

Figure 3:
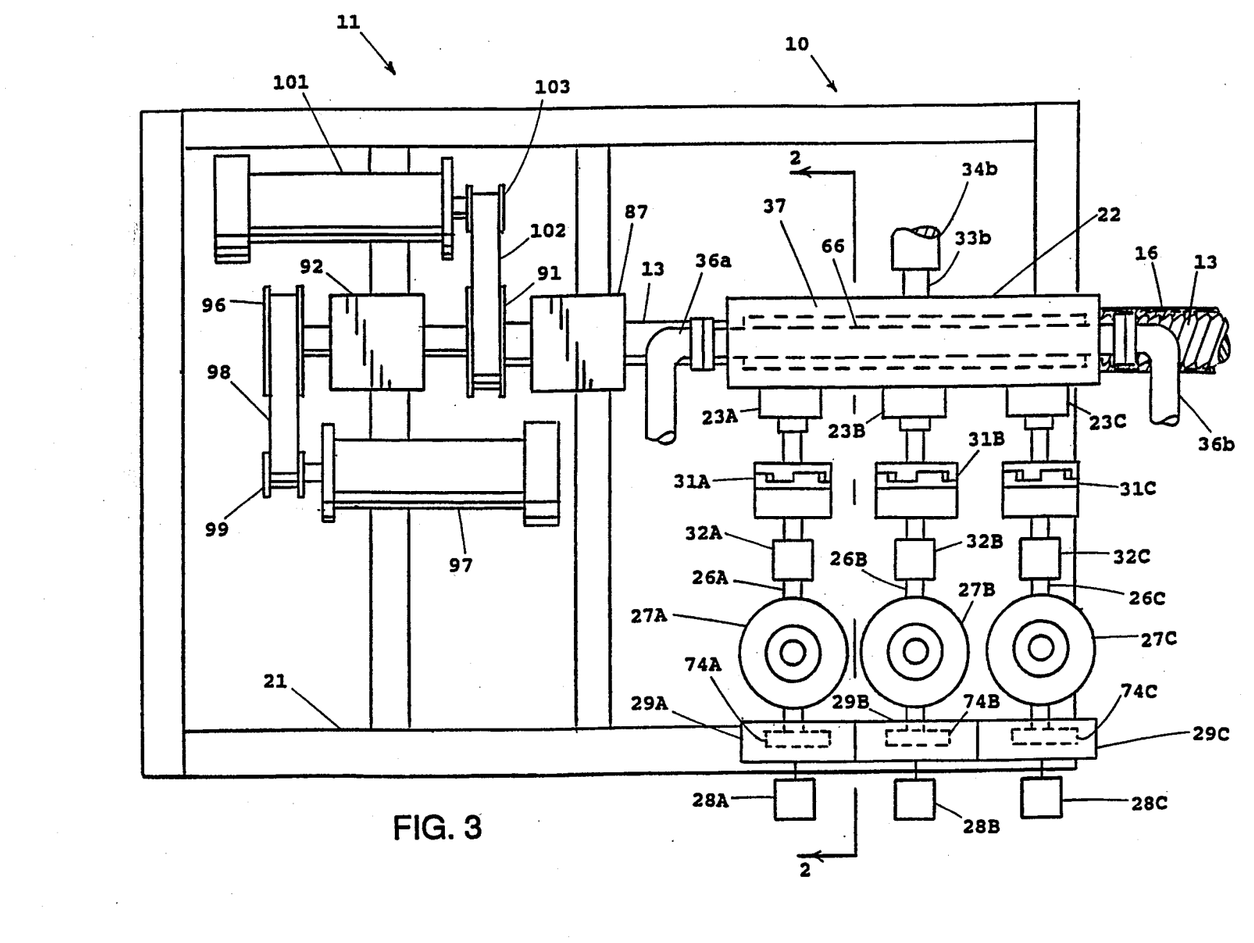
FIG. 3 is a top plan view of the apparatus shown in FIG. 1
Figure 5:
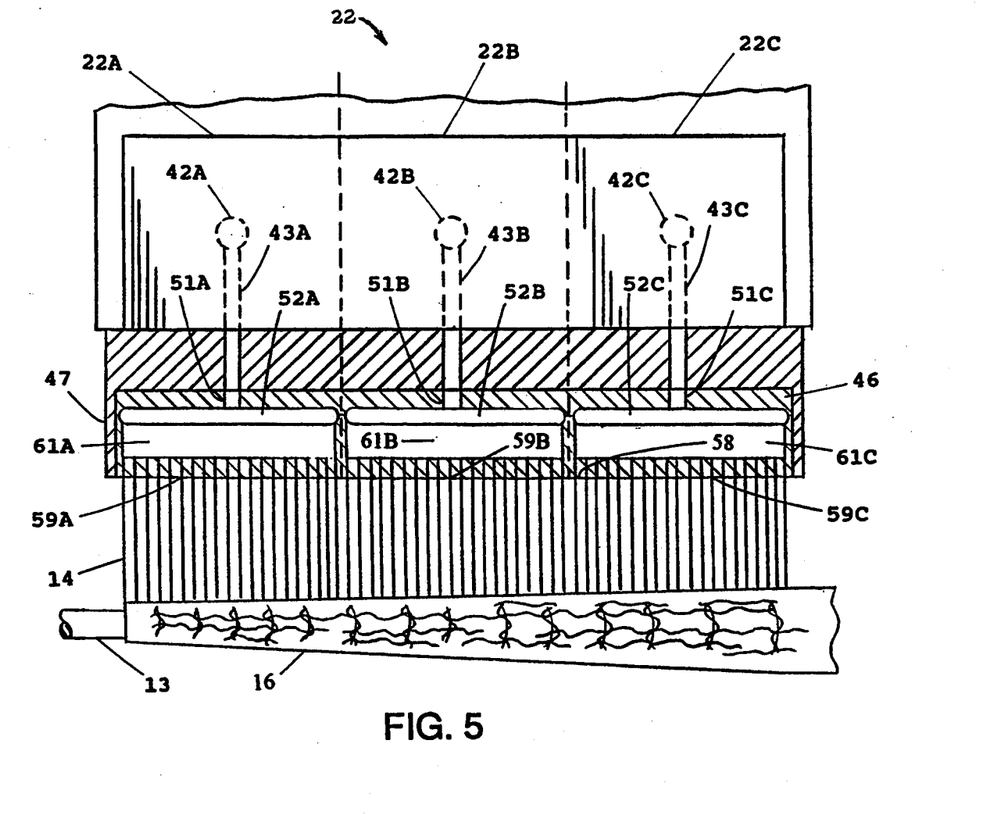
FIG. 5 is an enlarged, partially sectional view, of the die assembly shown depositing webs of various sizes onto a rotating mandrel.

In FIGS. 3 and 5, the different meltblowing units of the system 10 are designated by different letters with the same reference numeral for the corresponding part described above. For example, pump 23A is driven by motor 27A through shaft 26A. The pump 23A feeds polymer melt to a longitudinal portion of die assembly 22 designated 22A (see FIG. 5).

Although the present invention is described with reference to three die assembly units 22A, 22B, and 22C, the die assembly 22 may include a plurality of units ranging from 2 to 100, preferably 2 to 50, most preferably 2 to 20. (The dashed lines in FIG. 5 indicate the separate die assembly units 22A, 22B, and 22C.)

Figure 4:
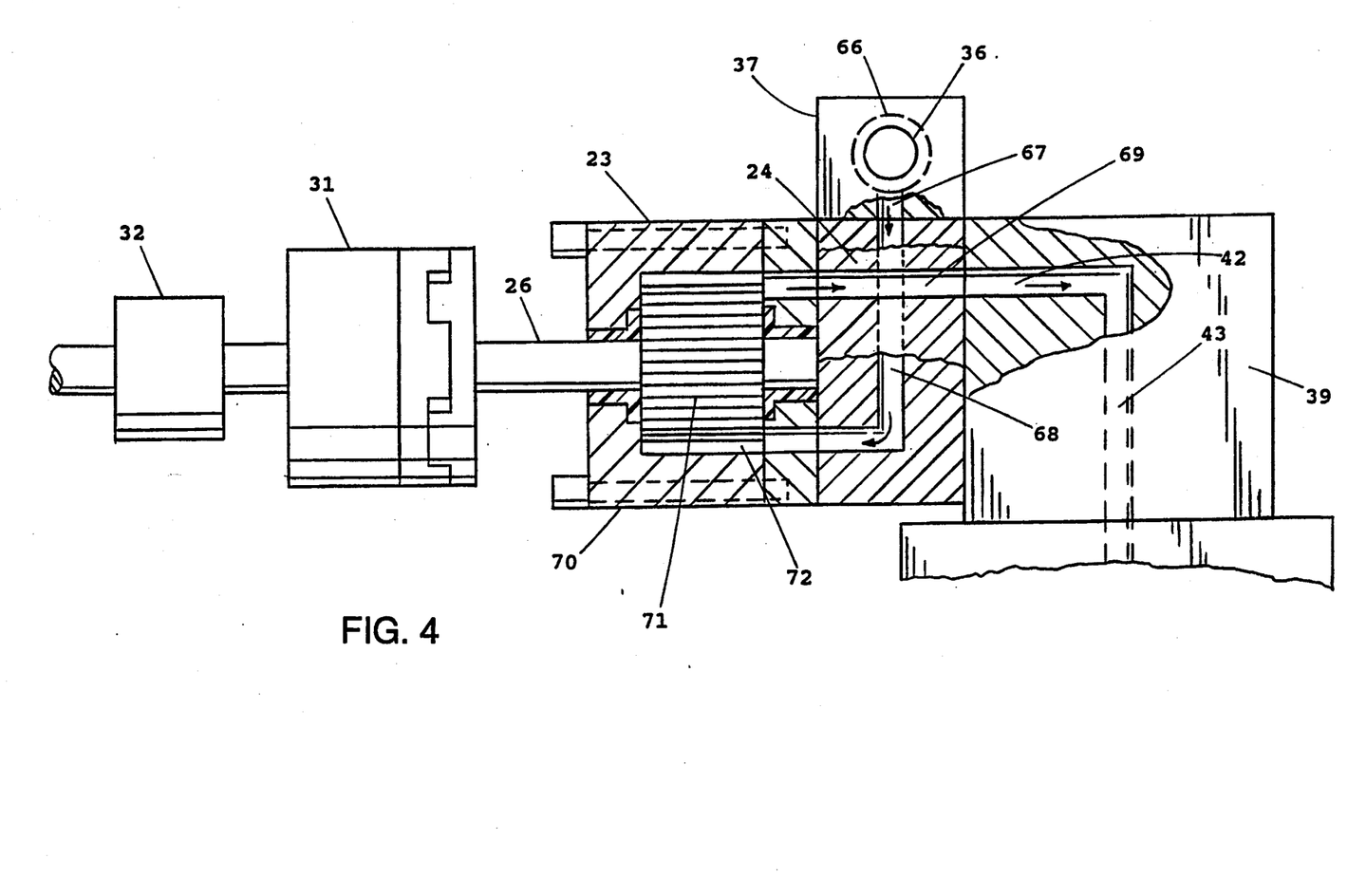
FIG. 4 is an enlarged view of the die body and pump assembly shown in FIG. 3, with portions cut away.

FIG. 4 depicts only one of the meltblowing units or component thereof of the meltblowing system, and is described without reference to the letters (i.e., A–C). It should be understood, however, that each meltblowing unit has components corresponding to those depicted in FIG. 4, unless otherwise indicated.

With reference to FIGS. 2 and 3, the melt-blowing system 10 operates as follows: polymer melt is delivered to the apparatus through lines 36a and 36b into manifold 37. The manifold 37 contains passages (described below) which conduct the polymer melt to each of the pump assemblies 23A–23C, and from there to the separate die units 22A–22C of the die assembly 22 where the melt is extruded as a plurality of side-by-side fibers 14 (best seen in FIG. 5). Converging hot air delivered to the die via air conduits 33a and 33b contacts the extruded fibers 14 and stretches them into microsized fibers. These fibers collect on the rotating mandrel 13 in a random manner forming a nonwoven seamless tube 16. (The terms "filaments" and "fibers" as used herein are interchangeable.)

As described in detail below, the rotating mandrel 13 causes the nonwoven tube 16 formed thereon to move parallel to the die 22 under each unit 22A, 22B, and 22C. Thus, the initial annular deposits of the meltblown fibers onto the mandrel 13 will have the characteristics of the fibers exiting unit 22A, and the second annular layer deposited on the first annular layer will have the characteristics of the fibers received from unit 22B, and finally the outermost annular layer will have the characteristics of the fibers received from unit 22C.

An important feature of the present invention is the variability of each of the layers. By controlling the extrusion conditions (e.g. polymer throughput of each unit) or varying the equipment (e.g. size of orifices of each unit), the properties of the layers may be determined. Also, the present invention contemplates the selective addition of additives such as powders, liquids, etc. to one or more of the polymer streams flowing through each unit. It is also within the skill of the art based on the present disclosure to modify the manifold 37 so that units can be fed with one or more of a different polymer than the other unit or units. Thus the tubular filter will have distinct radial layers which have different properties than the other layers. This permits the tailoring of the tubular filter for a variety of different filtering conditions.

As best seen in FIG. 2, the meltblowing die assembly 22 comprises an elongate die body 39, a die tip assembly 41 connected to the bottom of the die body 39. The die body and die tip components, as well as other parts of the system exposed to the high meltblowing temperatures may be machined from steel or steel alloys.

Referring to FIG. 4, the die body 39 has formed therein intersecting polymer flow passages 42 and 43 for each unit. Passage 42 is aligned with a polymer flow passage in the pump manifold 24 and passage 43 extends vertically in body 39, exiting at the underside thereof and serves to conduct polymer to the die tip assembly 41 as described below.

The manifold 24 and die body 39 may be provided with electric heaters (not shown) to heat and maintain the polymer passing therethrough at the desired temperature.

Returning to FIG. 2, the die tip assembly 41 is made up of three parts: (1) a transfer plate 46, (2) a die tip 47, and (3) air plates 48a and 48b. The transfer plate 46 may be bolted to the underside of the die tip 47 and this assembly bolted to the die body 39.

The transfer plate 46 extends substantially the entire length of the die body 39 (see FIG. 5) and has formed therein a polymer passage 51 (disclosed as 51A, 51B, and 51C) for each of the meltblowing units 22A–22C. The flow passage 51 exits into an elongate groove (semicircular in cross-section) formed in the underside of the transfer plate 46, which in combination with a similar groove formed in the upper side of the die tip 47 defines an elongate chamber 52 for each unit (i.e. 52A, 52B, and 52C).

The die tip 47 has formed therein a nose section 53 of triangular cross section which is flanked by elongate flanges 56 and 57 (see FIG. 2). The nose section 53 terminates in an apex 58, through which are drilled a plurality of orifices 59 (see also 59A–59C in FIG. 5). Channel 61 interconnects chamber 52 of each unit with a linear portion of the orifices 59. Thus, chamber 52A is in fluid communication with orifices 59A through channel 61A. Chambers 52B and 52C similarly are interconnected with orifices 59B and 59C, respectively, through channels 61B and 61C. The orifices 59 are aligned in a row along the apex 58. It is preferred that the orifices 59 are equally spaced along the full length of apex 58 as illustrated in FIG. 5.

Air plates 48a and 48b are mounted on the die body 39 as described in detail in U.S. patent application Ser. No. 757,848, filed Sep.11, 1991, now U.S. Pat. No. 5,236,641, the disclosure of which is incorporated herein by reference. The air plates 48a and 48b are adjustable, thereby permitting the adjustment of the dimensions referred to in the art as setback and air gap.

The inner surface of each air plate 48a and 48b is tapered and in combination with the flanking surfaces of the triangular nose section 53 define converging air passage 38a and 38b. The setback and air gap determine the geometry of air passages 38a and 38b.

Air passages 62a and 62b conduct hot air from lines 33a, 33b to air passages 38a and 38b, respectively. The air lines 33a and 33b are connected to the longitudinal mid-section of each air passage 62a and 62b.

Referring to FIGS. 2 and 5, polymer flow through each die assembly unit 22A, 22B, and 22C is via passages 42 and 43 of each unit, through passage 51 of transfer plate 46, into chamber 52, through channel 61 and, finally, through orifices 59; whereas, air from the inlet pipes 33a and 33b flows through passages 62a and 38a on one side of the orifices 59, and passages 62b and 38b on the other side, exiting as converging air sheets at apex 58 on opposite sides of the extruded fibers 14. The polymer flow paths through the meltblowing units 22A, 22B and 22C are parallel and independent of each other.

The hot air delivered to opposite sides of the die assembly 22 by lines 33a and 33b may include an in-line electric air heater 34a and 34b (see FIG. 1) which may be of the same construction as described in U.S. Pat. No. 5,145,689, the disclosure of which is incorporated herein by reference. Alternatively, the hot air may be provided by an electric or gas furnace. A compressor or blower (not shown) may be used to deliver air at the desired pressure (2 to 20 psi) to the inlet of die assembly 22.

The die body 39, transfer plate 46 (see FIG. 5), and die tip 47, as well as the air plates 48a and 48b are of the same general length, traversing the full length of the row of orifices 59. The die body 39, while being of unitary construction may be viewed as separate side-by-side sections provided with flow passages 42A, 42B, and 42C and 43A, 43B, and 43C. Likewise, the die tip assembly 41 may be viewed as separate side-by-side units having inlets 51A, 51B, and 51C feeding end-to-end chambers 52A, 52B, and 52C, respectively, which in turn feed orifices 59A, 59B, and 59C through passages 61A, 61B, and. 61C, respectively. Each side-by-side unit as described above operates independently from the other units. Thus, polymer entering passage 43A is extruded through orifices 59A only, 43B through 59B only, and 43C through 59C only.

While the polymer flow is through separate meltblowing units 22A, 22B and 22C in the system, only one air delivery system is provided. The air flow is through two main passages which converge from opposite sides of the nose piece 53 as described above in relation to FIG. 2. The air passages are not divided into units but extend substantially the entire length of the die.

As shown in FIG. 4, the die inlet polymer flow passage 42 (shown in FIG. 5 as 42A, 42B, and 42C for a die with multiple units 22A, 22B, and 22C, respectively), is fed by pump 23. The polymer flow to and from the pump 23 of each unit is provided by passages formed in the header manifold 37 and pump manifold 24. Polymer is delivered to a passage 66 in header manifold 37 which distributes the flow to a plurality of flow passages 67 of the header manifold 37. Manifold 24 has formed therein a pump suction passage 68 which registers with header manifold passage 67a and the inlet of pump 23. A pump outlet passage 69 extends from the outlet of the pump 23 to register with inlet passage 42 of die body 39.

The polymer flows into the header manifold 37 from lines 36a and 36b (see FIG. 3) and is distributed through header passage 66 to unit feed passages 67, one for each pump assembly 23A, 23B, and 23C. Polymer is fed to pumps 23A–23C through passage 68, and discharged from the pumps through passages 69, respectively, to die body inlet passages 42A–42C and outlet passages 43A–43C, respectively. The header passage 66 may be provided with a porous filter.

It should be noted that the header passage 66 may be constructed to feed only one or two of the distribution passages 67 and other polymer connections can be used to feed a different polymer or polymer formulation. For example, line 36a can be connected to passage 66 which feeds only distribution passage 67 for passage 42A and line 36b can feed passages 42B and 42C. The tubular filter made from this system would consist of one seamless annular layer of one polymer fiber and two seamless annular layers of a different polymer.

The pump 23 of each meltblowing unit may be any positive displacement pump as depicted in FIG. 4 which provides a fluid output rate proportional to drive shaft rotation rate. The preferred positive displacement pump is a gear pump which comprises a driven gear 71 keyed to shaft 26, and an idler gear (not shown). The gears are mounted in a suitable housing 70, the interior chamber 72 of which is in fluid communication with suction passage 68 and outlet passage 69. Rotation of the gears pumps polymer entering from passage 68 around the periphery of chamber 72 into outlet passage 69. Conventional packing and bearings may be employed in the gear pump.

As shown in FIG. 2, the drive shaft 26 is driven by a variable speed motor 27 through gear box 73. The drive shaft 26 may also include a coupling 32 and electromagnetic clutch 31. The clutch 31 is a safety device to prevent damage to the motor if the pump 23 fails. The output shaft 26 extends through the gear box 73 terminating in pump speed sensor gear 74. It is preferred that the electric motor 27 be variable speed and have an rpm output between 1500 to 2000, and that the gear box 73 have a gear reduction ratio of 20 to 1. An electric motor that has proven successful in the apparatus of the present invention is manufactured by Baldor. This 1725 rpm motor with gear reducer box provides an output range of 0 to 104 rpm. A sensor probe 29 such as a proximity switch or digital pulse encoder is used to detect the rpm of shaft 26 via gear 74. Each motor 27A–27C controls polymer throughput through its respective unit, independent of the other units. Motor controller 28 with input from the sensor 29 provide means for controlling motor rpm and hence polymer throughput through each unit, independent of the other units. As seen in FIG. 3, each unit includes a separate sensor 29A–29C and controller 28A–28C.

Although an almost infinite number of combinations and sizes of the meltblowing system components described above are possible, the following indicates the typical and preferred ranges.

|  | BROAD RANGE | PRE-FERRED RANGE | MOST PREFERRED RANGE (BEST MODE) |
| --- | --- | --- | --- |
| Length of Die (inches) | 1–150 | 4–150 | 6–150 |
| Number of Units | 2–100 | 2–50 | 2–20 |
| Length of Units (inches) | 0.5–12.0 | 1–8 | 1.5–3.0 |
| Orifice Diameter (inches) | 0.010–0.080 | 0.010–0.040 | 0.015–0.030 |
| Orifices/inch | 10–50 | 15–40 | 20–30 |
| Gear Pump Capacity (for each Unit lbs/hr) | 1–20 | 2–12 | 4–10 |
| Polymer Flow Rate (per unit lbs/hr) | 1–20 | 2–12 | 4–10 |
| Polymer Flow Rate (per orifice grams/min) | 0.8–3 | 0.9–2 | 1.0–1.6 |
| Air Gap (inches) | .010–.200 | .020–.150 | .040–.120 |
| Set Back (inches) | .010–.200 | .020–.150 | .040–.120 |
| Air Capacity (SCFM/inch) | 5–30 | 10–25 | 15–20 |

The apparatus of the present invention, because of the simple configuration of dividing the row of orifices into a plurality of groups, offers the advantage of providing the filter with small graduation of fiber size differences. For 2 to 100 orifice groups (preferably 2 to 50) groups, for example, the differences in average fiber size diameter can be small, differing by at least 10%. For fewer groups, the size difference should be at least 20%.

The meltblowing system of the present invention has been described in somewhat simplified form for clarity. In practice, many of the components illustrated as unitary bodies, such as die body and manifolds, may be made in two or more parts to facilitate assembly. Also, the system may include hoods or housings for safety and operation protection.

Details of the complete meltblowing system are described in U.S. patent application Ser. No. 757,848, referred to above.

Figure 6:
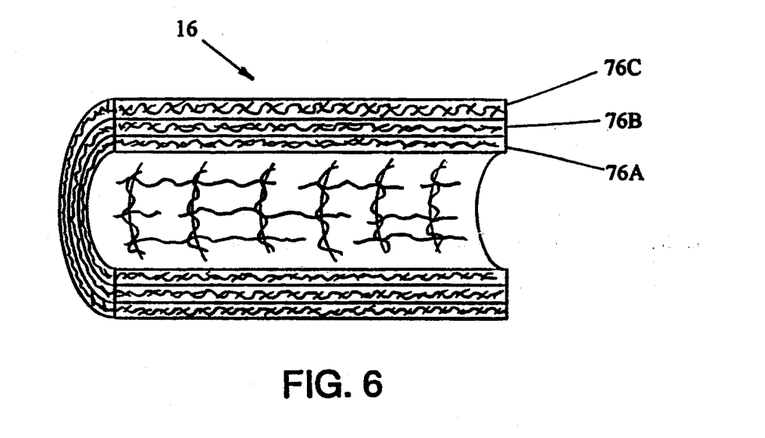
FIG. 6 is a cross-sectional view of a tubular filter having a fiber size gradient across the radius thereof.

FIG. 5 illustrates schematically the deposition of polymer fiber 14 extruded from each die unit 22A, 22B, and 22C onto a rotating mandrel 13. The fibers are wound around the mandrel 13 forming a tube 16 which, by means described below, is moved in succession under orifices 59A, 59B, and 59C. The unique construction of the meltblowing system 10 permits the fibers extruded from each die assembly unit 22A, 22B, and 22C to form annular layers of different properties or characteristics. For example, in one embodiment the orifices 59A may be larger than the orifices 59B which in turn are larger than the orifices 59C. The filter tube 16 made from this construction (as shown in FIG. 6) has an inner annular portion 76A of large fibers (e.g. from 3.0 to 10 microns) and the middle annular portion 76B of intermediate sized fibers (e.g. from 2 to 5 microns), and an outer annular portion 76C of small diameter fibers (e.g. from 0.75 to 3 microns). The average fiber sizes thus range from 0.75 to 10 microns. The size differences in the layers may be varied in any order. Generally, the average fiber size in one layer should be between 1.1 to 3, preferably 1.5 to 2 times that of the average fiber size of an adjacent layer. Size differentiation between layers 76A, 76B, and 76C may also be achieved by varying the polymer throughput through each unit by operation of pumps 23A, 23B and 23C. In this embodiment polymer throughput through unit 22A would be greatest, producing the largest fiber diameter for layer 76A, with pumps 23B and 23C being progressively less producing medium fiber size for layer 76B and smallest fibers for layer 76C.

Other variations of the filter tube construction are possible with the present meltblowing system and are described below under "Operation".

Mandrel Assembly

As indicated above, the mandrel assembly 11 provides rotating mandrel 13 for forming the meltblown tube and advancing it linearly underneath and parallel to the row of orifices 59 as fibers are deposited and wound thereon.

Figure 7:
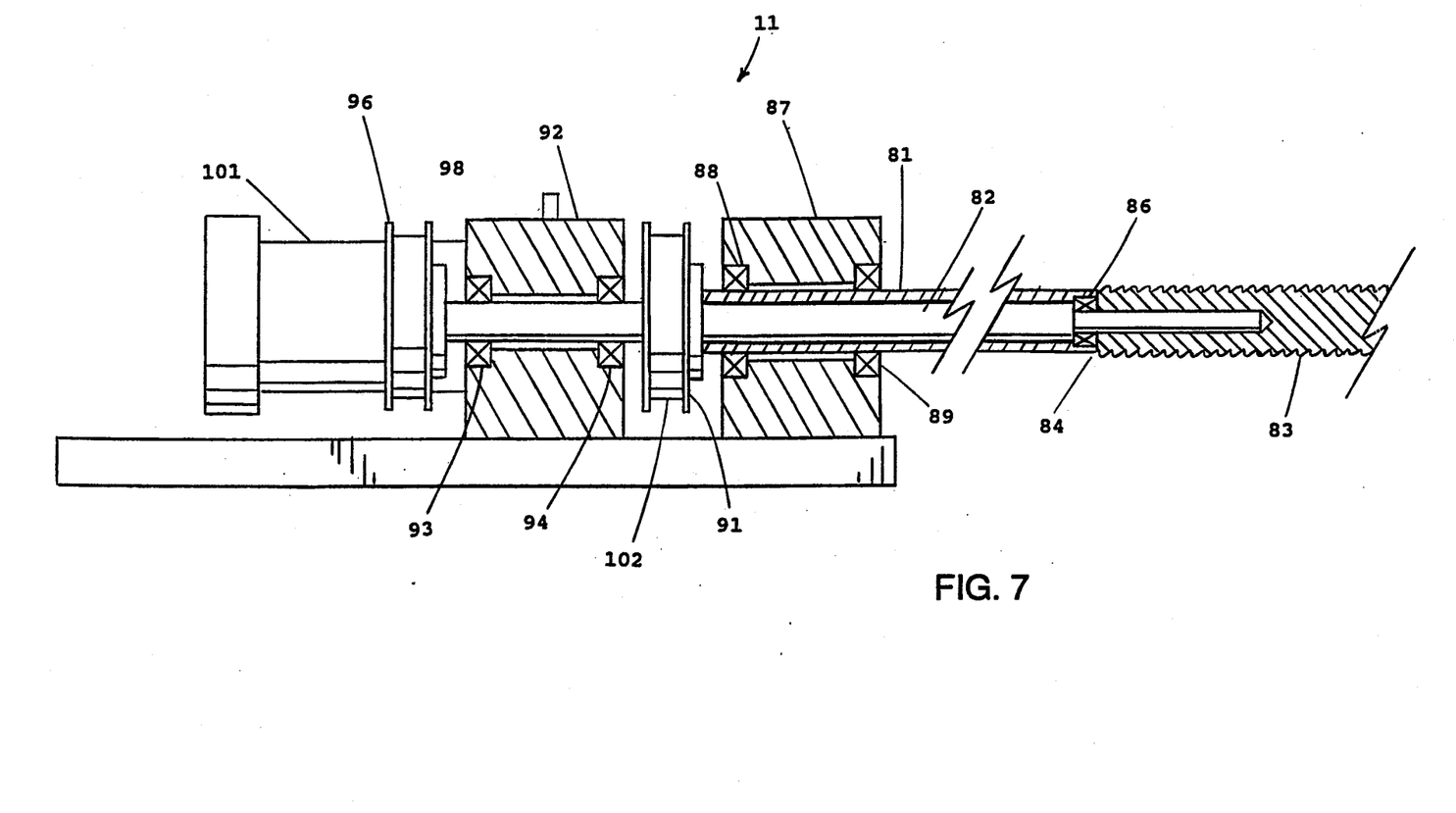
FIG. 7 is a sectional view showing the mandrel and drive mechanism.

As best seen in FIGS. 3 and 7, the rotating mandrel 13 comprises an outer shaft 81, an inner shaft 82, and a threaded screw take-off shaft 83 secured to and in axial alignment with the inner shaft 82 as at 84. The inner shaft 82 and screw take-off 83 rotate as a unit and are journaled to rotate relative to outer shaft 81 by bearing 86.

The outer shaft 81 is journaled in outer shaft bearing housing 87 by spaced apart bearings 88 and 89. An end of the outer shaft 81 extends a short distance out of housing 87 and is keyed to pulley 91.

The inner shaft 82 extends without interference through the outer shaft 81, including housing 87, through pulley 91 and is journaled to its own housing 92 by spaced apart bearings 93 and 94. Shaft 82 extends through housing 92 and is keyed to pulley 96. The inner shaft 82 and screw take-off 83 are rotatable independently of outer shaft 81. As shown in FIG. 7, the take-off screw 83 is threaded and the outer periphery of shaft 81 is smooth. The outer diameter of shaft 81 is approximately equal to the outer diameter of the threads of shaft 83.

Referring to FIG. 3, pulley 96 is driven by motor 97 through belt 98 which drivingly connects pulley 96 and motor pulley 99. Similarly pulley 91 is driven by motor 101 through belt 102 trained around motor pulley 103 and shaft pulley 91.

The motors 97 and 101 may be variable speed D.C. motors and the pulley sizes are selected so that the shafts 81 and 82 are driven at an rpm of between 200 to 2000. Independent controls (not shown) are provided for each motor 97 and 101 to provide for independent rpm control of the motors and hence the shafts.

Although the size (diameter) of the shafts 81 and 83 can vary within a relatively wide range, the following dimensions are suitable for making filters having a core opening of 0.75 to 4 inches.

|  | Broad Range (in.) | Preferred Range (in.) |
|---|---|---|
| Shaft 81 - Diameter | 0.5–20 | 1–5 |
| Length | 3–60 | 5–30 |
| Screw Take-off 83 |  |  |
| Diameter | 0.75–20 | 1–5 |
| Length | 1–20 | 1.5–15 |

The screw 83 is threaded in relation to its direction of rotation to force tube 16 to move to the right as disclosed in the drawings.

The length of shaft 82 and screw take-off 83 are sized in proportion to the length of the row of orifices 59. As a general rule, more than 50% and up to 75% of the orifice row is traversed by the smooth shaft 81 and about 25% to 50% of the orifices row 59 is traversed by the screw take-off 83. The outer end of the screw 83 extends well beyond the die assembly 22 to permit cutting of the tube 16 to the proper length without interfering with the tube formation. The components of the mandrel assembly described above may be mounted on frame 21.

Although the preferred mandrel assembly 11 is as described above, other mandrel assemblies may be used in connection with certain aspects of the present invention. For example, the assembly disclosed in U.S. Pat. No. 3,933,557 comprising external rollers may be used, the disclosure of which is incorporated herein by reference.

Tube Cutting and Collection Assembly:

As schematically illustrated in FIG. 1, the cutting assembly 12 comprises a rotating blade 17 mounted on the shaft of motor 106. The motor 106 may be mounted on the frame 21 to permit adjustment of the blade 17 and permit movement of the motor and blade in a vertical plane to cut tubular lengths 18 from the tube 16 being discharged off screw 83.

The blade is preferably composed of steel or tungsten and is rotated at from 1000 to 3000 rpm. The blade 17 motor 106 are pivotable or otherwise movable as by a hydraulic ram to cause the blade to move in a vertical plane and sever the filter tube 18 from tube 16 as illustrated in FIG. 1. The tube 18 may be collected in a container 19 as schematically illustrated in FIG. 1. More sophisticated collection methods of course may be employed such as conveyors.

Operation:

The operation of the apparatus described above will be described with reference to the following example.

A meltblowing system 10 comprising die assembly 22 having three units was mounted on frame 21 in relation to the mandrel assembly 11 and cutting assembly 12. The dimensions and construction of the meltblowing system were generally within the most preferred ranges recited above. The meltblowing system was movably mounted on tracks (not shown) secured to the frame to permit its withdrawal and access to the die assembly 22 for repair, maintenance, and adjustment.

The row of orifices need not be parallel to the mandrel, but should lie in the same vertical plane and are positioned from 2 to 20 inches above the mandrel 13.

The die assembly 22 may be fed by a conventional extruder in a conventional hook-up to lines 36a and 36b or it may be fed by the polymer delivery system disclosed in U.S. Pat. No. 5,061,170.

Any polymer capable of being meltblown may be used. The typical meltblowing web forming resins include a wide range of polyolefins such as propylene and ethylene homopolymers and copolymers. Specific thermoplastics include ethylene acrylic copolymers, nylon, polyamides, polyesters, polystyrene, poly-(methylmethacrylate), polytrifluoro-chloroethylene, polyurethanes, polycarbonates, silicone sulfide, and poly(ethylterephthalate), pitch, and blends of the above. The preferred resin is polypropylene. The above list is not intended to be limiting, as new and improved meltblowing thermoplastic resins continue to be developed. Hot melt adhesives may also be used.

The operating temperature of the meltblowing system will, of course, depend on the resin employed, but for PP (MFR of 800), they may be as follows:

Polymer temperatures: 475° to 520° Fahrenheit
Air temperatures: 500° to 750° Fahrenheit.

The mandrel assembly 11 included 1 inch diameter outer shaft 81, 1¼ inch diameter (threaded section) screw shaft 83 and a 5 thread inch pitch. The motor rpms and pulley ratios were sized to rotate the shafts 81 and 83 at 900 rpm and 1000 rpm, respectively, during operation.

The mandrel 13 was placed under the row of orifices at a distance of 12 inches, and the cutting blade 17 was positioned to cut filter lengths of 10 inches off tube 16.

The pumps 23A, 23B, and 23C were each driven at a rate to provide a flow through orifices as follows:

| Orifices 59A | 0.5 Gr./orifice |
|---|---|
| Orifices 59B | 0.8 Gr./orifice |
| Orifices 59C | 1.5 Gr./orifice |

This produced variable fiber size of each annular layer A, 76B, and 76C as follows (for radially inward flow filter):

|  | Average Fiber Diameter (microns) |
|---|---|
| Inner Layer 76A | 1.8 |
| Middle Layer 76B | 3 |
| Outer Layer 76C | 5 |

Upon startup shaft 81 and screw 83 were rotated at the same rpm to initiate tube formation thereon. When a sufficient tube 16 was formed, the screw take-off 83 was driven slightly faster (approximately 15%) than shaft 81. The screw take-off 83 engaging the interior of the tube drives the tube to the right as viewed in FIG. 1. As the full diameter tube 16 is withdrawn, the thinner tube portion forming under orifices 59 are pulled along the smooth shaft 81. The diameter of tube 16 is thus increased as it moves progressively under orifices 59A, 59B, and 59C. The diameter of each annular layer 76A, 76B, and 76C can be controlled by the rpms of shaft 81 and screw take-off 83 as well as the polymer flow through orifices 59A, 59B, and 59C.

The final size and composition of the filter tube 18 will depend upon the intended use of the filter and can vary within wide limits. The following ranges and compositions are merely presented as representative examples:

|  | Annular Radial Thickness (Inches) | Length (Inches) | Average Fiber Diameter (microns) |
|---|---|---|---|
| Layer 76A | 0.5 to 1.5 | 4–12 | 1 to 10 |
| Layer 76B | 0.25 to 1.5 | 4–12 | 2 to 10 |

| | Annular Radial Thickness (Inches) | Length (Inches) | Average Fiber Diameter (microns) |
|---|---|---|---|
| Layer 76C | 0.25 to 1.5 | 4–12 | 3 to 10 |

It should be observed that the transition from the layer-to-layer (e.g. 76A and 76B) as the tube 16 moves from orifices 59A to 59B is extremely smooth because of the in-line deposition of the fibers. In addition, it is well known in the art that nonwoven fabrics are held together by a combination of filament entanglement and inter-filament bonding while still in the molten state during deposition. In nonwoven tubes constructed according to present invention, there is no distinct transition from layer-to-layer in terms of the filament entanglement and bonding. There is, however, a measurably distinct transition in average filament diameter from layer-to-layer. The resulting tube 16 and filter 18 exhibit excellent structural integrity and minimal delamination.

The above description of the operation is given in reference to a specific filter. It is to be understood that wide variations in the tubular filter composition and dimensions are possible. For example, a number of layers may be made by simply increasing the number of meltblowing units in the die. Also, different polymers may be used in each unit so that the final tubular filter may contain multiple layers of different fiber sizes and/or compositions. Also, the variations of polymer flow or polymer description through each unit may be in any order.

What is claimed is:

1. Apparatus for manufacturing a nonwoven seamless continuous tube which comprises:
   (a) a meltblowing die having a first and second groups of orifices;
   (b) a rotating mandrel positioned in alignment with the orifice groups;
   (c) a first pump for delivering and extruding a polymer melt through the first group of orifices to form a first seamless filament layer on the mandrel;
   (d) means for moving the first filament layer under the second group of orifices;
   (e) a second pump for delivering a polymer melt through the second group of orifices to form a second seamless layer of filaments on the first layer, thereby forming a two-layered tube; and
   (f) means for withdrawing the tube from the mandrel.

2. The apparatus of claim 1 wherein the first and second groups of orifices are aligned in a continuous row of side-by-side orifices.

3. The apparatus of claim 1 and further comprising controls for operating the first and second pumps at different rates whereby the filaments extruded through the first and second group of orifices are of different average diameter.

4. The apparatus of claim 3 wherein the controls are adapted to operate the first pump at a higher throughput rate than the second pump whereby the average filament diameter of the first layer is larger than the average filament diameter of the second layer.

5. The apparatus of claim 1 further comprising a third group of orifices and a third pump for delivering and extruding a polymer melt through the third group of orifices to form a third seamless filament layer onto and around the second layer, and wherein the controls for the pumps include means for operating the first, second, and third pumps at different rates.

6. Apparatus for manufacturing a nonwoven seamless continuous tube which comprises:
   (a) a meltblowing die having a row of orifices comprising first and second groups;
   (b) a rotating mandrel positioned in alignment with the orifice groups;
   (c) means for delivering and extruding a polymer melt through the first group of orifices to form a first seamless filament layer on the mandrel;
   (d) means for moving the first filament layer under the second group of orifices;
   (e) means for delivering and extruding a polymer melt through the second group of orifices at a rate different than polymer flow through the first group of orifices to form a second seamless layer of filaments on the first layer, thereby forming a two-layered tube; and
   (f) means for withdrawing the tube from the mandrel.

7. The apparatus of claim 6 wherein the orifices of the first group have sizes different than the orifices of the second group.

8. The apparatus of claim 6 and further comprising a first pump for delivering polymer melt at a rate to the first group of orifices, and a second pump for delivering polymer melt to the second group of orifices at a rate different than the rate of the first pump.

9. Apparatus for manufacturing a nonwoven seamless, multi-layer web which comprises:
   (a) a meltblowing die having a row of orifices comprising 5 or more groups arranged in end-to-end relation;
   (b) a rotating mandrel positioned in alignment with the row of orifices;
   (c) means for flowing polymer melt through each orifice group so that the polymer flow rate through each orifice of one group is different from the polymer flow rate through each orifice of the other groups thereby forming a layer of meltblown fibers from each group and having a different average fiber size from an adjacent layer, said layers forming a seamless tube as the mandrel rotates; and
   (d) means for withdrawing the tube from the mandrel.

10. An apparatus for manufacturing a nonwoven seamless composite tube which comprises:
    (a) die for meltblowing a polymer melt and having a row of orifices comprising a first and second group;
    (b) a rotating mandrel positioned in alignment with the orifice groups;
    (c) a first pump for delivering and extruding a polymer melt through the first orifice group to form a seamless less filament layer on the mandrel;
    (d) means for moving the first filament layer under the second group of orifices;
    (e) a second pump for delivering and extruding through the second orifice group a polymer melt of different composition than that delivered by the first pump to form around the first filament layer a second filament layer of different composition, thereby forming a two layer composite tube; and
    (f) means for withdrawing the tube from the mandrel.

11. A process for manufacturing a seamless tubular non-woven tube which comprises:
    (a) meltblowing a molten thermoplastic polymer from a first group of orifices onto a rotating mandrel to form a first continuous layer of meltblown filaments thereon;

(b) passing the first layer along the mandrel under a second group of orifices;

(c) meltblowing a molten thermoplastic polymer from a second group of orifices onto the first layer of the rotating mandrel as the first layer moves along the mandrel under the second group of orifices to form a second continuous layer on the first layer, thereby forming a multi-layer seamless, continuous tube, each layer differing from the other layer in fiber size or composition; and (d) withdrawing the tube from the mandrel.

12. The process of claim 11 wherein the polymer melt extruded through each group of orifices is the same.

13. The process of claim 12 wherein the meltblowing of the polymer melt through the first group of orifices produces filaments of average diameter larger than the average diameter of the filaments produced by the second group of orifices.

14. The process of claim 11 wherein the polymer is a melt of polymers and copolymers selected from the group consisting of ethylene and propylene polymers and copolymers.

15. The process of claim 14 wherein the average diameter of the filaments produced from the first group of orifices ranges from 0.75 to 10 microns and the average diameter of the filaments produced by the second group of orifices ranges differing from that of the filaments produced by the first group of orifices by at least 10%.

16. The process of claim 11 wherein the polymer meltblown through the first group of orifices is at a different rate per orifice than the polymer meltblown through the second group of orifices.

17. An apparatus for producing seamless continuous non-woven tubes which includes a die for spinning filaments onto a rotating mandrel to form a continuous tube of nonwoven filaments thereon, the improvement wherein the mandrel comprises:

(a) a hollow outer shaft;

(b) an inner shaft extending through the outer shaft and having an end portion extending axially outwardly from the outer shaft, the end portion being threaded and in combination with the outer shaft being positioned in relation to the die to receive and wind filaments thereon;

(c) means for rotating the inner and outer shafts independently at the rate for receiving a layer of filaments on the outer shaft and the end portion of the inner shaft; and (d) means for rotating the inner shaft at an rpm different than the outer shaft whereby the rotating threads of the end portion of the inner shaft engages the tube of nonwoven filaments forcing the tube to move axially along the outer shaft.

18. The apparatus of claim 17 wherein the die comprises a row of orifices and the rotating mandrel is aligned with the row of orifices whereby the outer shaft traverses and is in alignment with a major portion of the row of orifices, and the threaded portion of the inner shaft traverses and is in alignment with a minor portion of the row of orifices.

19. The apparatus of claim 18 wherein the outer shaft traverses from 50 to 75% of the row of orifices and the threaded end portion of the inner shaft traverses from 25 to 50% of the row of orifices.

20. The apparatus of claim 17 wherein the means for rotating the shafts includes means for rotating the shafts in the same direction and the threaded portion at a rate at least 10% faster than the outer shaft.

* * * * *